United States Patent
Kilpeläinen et al.

(10) Patent No.: US 8,323,397 B2
(45) Date of Patent: Dec. 4, 2012

(54) TALC FOR PAINT PRODUCTS AND METHOD OF MAKING THE SAME

(75) Inventors: Veli Kilpeläinen, Vuokatti (FI); Hannele Hevosmaa, Kajaani (FI)

(73) Assignee: Mondo Minerals B.V. Branch Finland, Helsinki (FI)

( * ) Notice: Subject to any disclaimer, the term of this patent is extended or adjusted under 35 U.S.C. 154(b) by 0 days.

(21) Appl. No.: 13/128,564

(22) PCT Filed: Nov. 11, 2008

(86) PCT No.: PCT/FI2008/050648
§ 371 (c)(1),
(2), (4) Date: Aug. 1, 2011

(87) PCT Pub. No.: WO2010/055191
PCT Pub. Date: May 20, 2010

(65) Prior Publication Data
US 2011/0277667 A1    Nov. 17, 2011

(51) Int. Cl.
*C01B 33/22* (2006.01)
(52) U.S. Cl. .................................. 106/469; 106/800
(58) Field of Classification Search .............. 106/469, 106/800
See application file for complete search history.

(56) References Cited

U.S. PATENT DOCUMENTS

| | | | |
|---|---|---|---|
| 5,676,748 A | | 10/1997 | Brown |
| 6,074,473 A | * | 6/2000 | Nichols et al. ............. 106/469 |
| 6,267,811 B1 | | 7/2001 | Cherukuri |
| 6,565,646 B1 | * | 5/2003 | Lasmarias et al. ......... 106/801 |
| 7,249,723 B2 | * | 7/2007 | He et al. ..................... 241/21 |
| 7,258,732 B2 | * | 8/2007 | Nichols ...................... 106/469 |

FOREIGN PATENT DOCUMENTS

| | | |
|---|---|---|
| DE | 39 07 142 A1 | 9/1989 |
| FR | 2526061 A1 | 11/1983 |
| GB | 1286384 A | 8/1972 |
| JP | 62 074442 A | 4/1987 |
| JP | 3076763 A | 4/1991 |

OTHER PUBLICATIONS

International Search Report, dated Nov. 9, 2009, from corresponding PCT application.
Eurasian Search Report, dated Dec. 2, 2011, from corresponding application No. 201170637.

* cited by examiner

*Primary Examiner* — Anthony J Green
(74) *Attorney, Agent, or Firm* — Young & Thompson (57) ABSTRACT

A talc slurry and a method of producing the talc slurry. A talc product includes the talc slurry having total solids (TS) 40% or higher and a dispersant agent and/or a thickener.

19 Claims, 7 Drawing Sheets

TALC FOR PAINT PRODUCTS AND METHOD OF MAKING THE SAME

FIELD OF THE INVENTION

The present invention relates to talc for paint products. The invention relates also to the method of producing said talc product.

BACKGROUND OF THE INVENTION

Talc products for paints are manufactured by milling specific talc ores in dry milling processes to the talc powders with desired particle size distribution. Typical median particle size for paint talc product is 1 to 25 µm and upper top cut is from 10 µm to 200 µm. Median particle size for talc powder used in paints cause different decorative properties to paints, e.g. high median particle size decreases gloss and low median size increases covering power. Median particle size also has influence on mechanical properties, e.g. on wet scrub resistance, of paints.

Dry powders are then dispersed in water during the production of water based paints. This causes problems because it is difficult to get homogenous dispersion of solid particles. Talc powders also cause dusting problems during storing and handling stages.

GENERAL DESCRIPTION OF THE INVENTION

It is the object of the present invention to improve the processability of talc for paint products.

For achieving this aim, the invention is characterized by features that are enlisted in the independent claims. Other claims represent preferred embodiments of the invention.

According to invention the talc product is talc slurry having total solids (TS) 40% and comprising a dispersant agent and/or a thickener. Said thickener improves the wetting of talc surfaces and improves the stability of talc slurry. Said dispersant agent improves the dispersing of talc in water. Said dispersant agent also makes grinding of talc easier. This kind of talc is ready dispersed in water and it makes a homogenous dispersion of talc in water. Users don't need to disperse the talc and so this new product is ready to use and can be added in any phase of the paint production, which increases the paint production capacity and makes the process more flexible.

The slurried talc also reduces the storage space needed compared with storing of same amount of dry powder. Talc slurry is also pumpable. The paint production process is thus easier to get automated by using talc slurry instead of dry power form talc. So it increases the production capacity of paint producers. Waste of packing material is also avoided by using talc slurry. When the talc is in slurry form, there is no dusting problem during storing and handling stages.

According to one aspect of the invention total solids (TS) of said talc slurry is 50% or higher. Advantageously total solids (TS) of said talc slurry is 60% or higher. This kind of talc slurry further reduces the storage space needed compared with storing of same amount of dry powder.

According to one aspect of the invention viscosity of talc slurry is 300 to 600 mPas (Brookfield Br100). This kind talc slurry is easy to pump.

According to one aspect of the invention storage stability of said talc product is 10%, which is measured as the sedimentation of talc particles in one month storing test in container where is no mixing. This kind of talc slurry is especially suitable talc for paint products.

In this document particle size of talc is expressed as an equivalent diameter of spherical particle that has the same falling rate in water as talc particles measured.

According to one aspect of the invention the talc slurry has unimodal PSD with average particle size (peak value) between 1-50 µm. This kind of talc is easy to pump and makes it possible to use unimodal, conventional or narrow PSD talc. Unimodal, narrow PSD talc has benefits in some specific application, for instance very fine talc (average PS between 1-3 µm) for thin film thickness coatings and lacquers to improve opacity, whiteness and sandability and adjust the gloss. Narrow and unimodal PSD of coarse talc (average PS between 10-30 µm) is beneficial in thick film protective coatings to achieve high enough film thickness (high solid content) without increasing the viscosity of paint.

According to one aspect of the invention talc slurry has multimodal particle size distribution between 1 to 50 µm. This improves the balance of paint properties. It also improves the stability of slurry compared to conventional unimodal or very narrow PSD talc.

Talc product having multimodal particle size distribution improves the paint property profile. It improves the paint quality compared to currently available product on the market. All the important decorative paint properties are either improved or kept constant compared to the conventional type of talc product. It makes also production of paints easier. The ready dispersed talc slurry can be added into the paint formulation in any phase of the paint production.

According to one aspect of the invention the talc product has at least two peaks of particle size distribution between 1 to 50 µm. According to one aspect of the invention the talc product has at least three peaks of particle size distribution between 1 to 50 µm. This bi-modal/multimodal particle size distribution improves the balance of paint properties and decreases gloss, increases covering power and/or increases mechanical properties of paint.

According to one aspect of the invention the talc product has multimodal PSD with two or more peaks between 1 to 50 µm. The multimodal PSD improves the balance of paint properties. According to one aspect of the invention one of the peaks of particle size distribution is between 1 to 5 µm. The fine particles, peaks between 1 to 5 µm, improve the balance between covering power and whiteness of the paint film. According to one aspect of the invention one of the peaks of particle size distribution is between 5 to 20 µm. The medium fine talc particles, peaks between 5 to 20 µm, improve the mechanical properties like wet scrub resistance and mud cracking resistance of paints. According to one aspect of the invention the slurry has at least one peak of particle size distribution being between 10 to 50 µm. Coarse talc particles, peaks between 10 to 50 µm, reduce the gloss (sheen) of paints. The multimodal (broad) PSD of talc allows the increase of talc content in the slurry without worsening of pumpability and stability of the slurry.

Talc slurry can be prepared in several different ways. Said talc slurry can be produced e.g. by using of semi-finished goods, e.g. talc concentrate or by milling talc ore and/or pre-slurry talc by wet milling process Talc can be milled by using normal conventional type of dry milling techniques like ball mills, impact mills or jet mills (steam or compressed air), to get final fineness for talc. After the milling dry talc powder can be directly dispersed in water by using suitable chemicals or it can be first granulated after which dispersed in water. Finally the talc slurry is stabilized by using suitable stabilizers.

Another way is to prepare the slurry already during the milling phase. This method requires wet milling techniques like wet ball or pearl milling. This method requires the constant feed of chemicals to the mills together with talc raw material and water to get smooth milling and high enough solid content to the final slurry. After the milling the talc slurry is further stabilized, after which it is ready to be used for paint production. The particle size distribution (PSD) of talc is controlled by filling rate of milling pieces (balls or pearls) in the mills. Different size (diameter) of milling balls or pearls gives different size of talc. The PSD of talc wanted is achieved by adjusting the ratio of different size of grinding pieces. The residence time of talc slurry in mills affects also the particle size of talc. There can be several mills in series if needed. The wet milling is an advantageous technique to prepare talc slurry for paints because there is no need to dry the product during the manufacturing, which reduces the production costs. Thus the preparation of the talc product into slurry form is technically easy and thus production costs are low. Wet milling process also enables the production of the special type of products.

Advantageous wet milling is made by wet pearled mill. It has been also seen that wet pearl milling gives the possibility to prepare multi-modal PSD talc. The multi-modal PSD is beneficial for storage stability of talc slurry and it improves the balance or paint properties.

The multi-modal talc slurry product can be prepared also by using the normal unimodal, dry milled, products as a mixture in slurry preparation.

The talc slurry can be delivered either in reusable containers or by silo trucks, which reduces the amount of packing materials.

Figure 7:
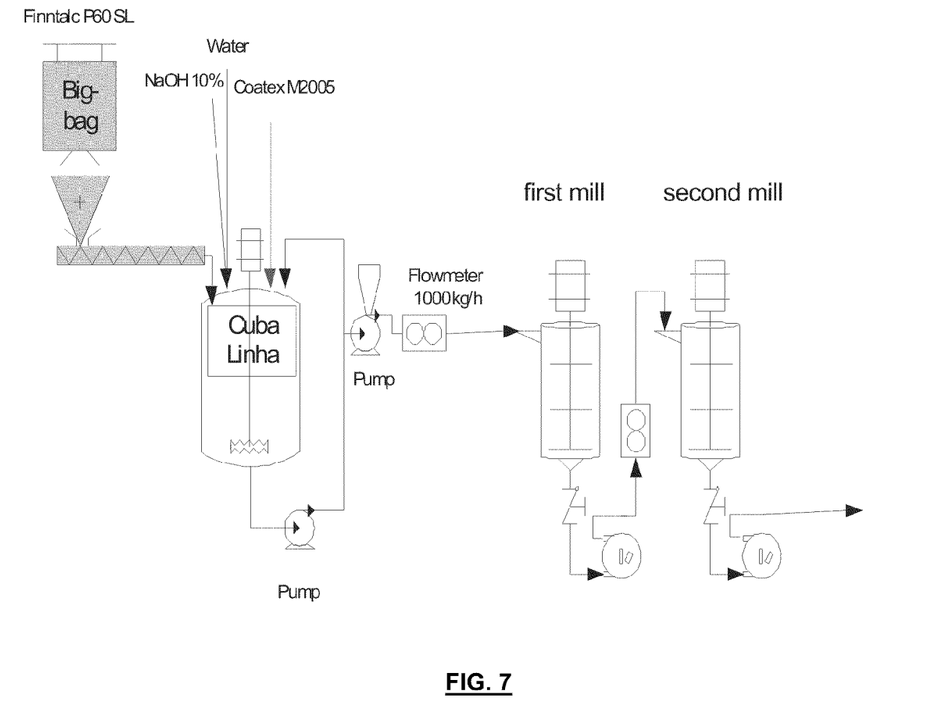
FIG. 7 is a flow diagram of an embodiment of a method for producing the talc slurry.

Production process of talc slurry comprises e.g. the steps:
pregrinding of talc ore for producing talc,
wet milling of pregrinded talc to end products,
during the wet milling additives like dispersing and thickening agents and pH, regulator can be added,
stabilizing the slurry by cellulose based or synthetic thickener Production process of talc slurry produced from pregrined starting material or from ready milled end product comprises e.g. the steps:
producing pre-slurry talc by adding of water and talc to process tank, and
adding of base, e.g. NaOH, to water or to pre-slurry talc in order to achieve pH-value 9.0 or higher
adding of a thickener to pre-slurry talc
adding of a dispersant to pre-slurry talc
milling said pre-slurry talc by wet milling process
sieving milled pre-slurry talc An example of process flow sheet of the invention is shown in FIG. 7.

Wet grinding can reduce the whiteness of end product e.g. by 4-5 whiteness %-units compared if the same product is made by dry milling. So it is advantageous to use very high whiteness starting material, e.g. talc lumps, in wet pearl milling to get optimum product.

Talc product can be used in e.g. in following paint products:
Interior and exterior flat emulsion paints
Multi purpose interior/exterior emulsion paints
Semigloss emulsion paints
Out door wood coatings
Wood primers
Textured paints
Silk and eggshell paints

DETAILED DESCRIPTION OF THE INVENTION

An embodiment of the invention is explained in more detail below, with reference to the appended drawing.

Talc Slurry—milling and stabilisation trial

Materials

Talc—Finntalc P60 SL ($d_{50}$ around 84 μm).

Dispersing agent—specific dispersing agent where wetting property is also involved.

NaOH (Solvay, >98%) at 10% in water was used to neutralise the dispersing agent.

Cellulose thickeners for the stabilization of the slurry: Celfow and Finnfix 2000G from CP Kelco.

Biocide—Thor MBF 28.

Initial Target Compositions

TABLE 1

Composition with Celflow

| Component | w-% | Comments |
|---|---|---|
| 1. Water | 38.40 | |
| 2. Dispersing agent, (solids = 26 w-%) | 0.96 | 0.50% dry on dry |
| 3. Biocide (Acticide BX) | 0.20 | |
| 4. NaOH (10 w-%) | 1.04 | => pH ~9.0 |
| 5. Talc (Finntalc M20SL - lab trial) | 50.10 | Mix by circumferential speed = 15 m/s. |
| 6. Celflow S-50 Dry | 0.40 | 0.8% dry on dry Mixing for 20 minutes by circumferential speed = 15 m/s |
| 7. Rest water | 8.90 | |
| Total | 100.0 | |

TABLE 2

Composition with Finnfix 2000G

| Component | w-% | Comments |
|---|---|---|
| 1. Water | 38.4 | |
| 2. Dispersing agent, (solids = 26 w-%) | 0.96 | 0.50% dry on dry |
| 3. Biocide (Acticide BX) | 0.2 | |
| 4. NaOH (10 w %) | 1.04 | => pH ~9.0 |
| 5. Talc, (Finntalc M20SL - lab trial) | 50.1 | Mix by circumferential speed = 15 m/s. |
| 6. CMC Finnfix 2000G Dry | 0.54 | 1.08% dry on dry Mixing for 20 minutes by circumferential speed = 15 m/s |
| 7. Rest water | 8.8 | |

In the industrial test was used 0.7% of the dispersing agent.

Industrial Trial

Pre-slurry was made in a 3 m³ tank equipped with a cutting type agitator. To make the pre-slurry, water was added first, then NaOH (10%), dispersing agent and finally the talc P60

SL. All the dispersant was added in the pre-slurry—no addition of dispersant was made to the mills. The quantity of dispersant was always 0.7% (d/d).

The flow sheet of the process is shown in FIG. 7.

The pH of the final pre-slurry was measured and was corrected when necessary, to achieve a value above 9. During the trial, several mixes of pre-slurry were made to make it available for the milling process.

In the first trial, the pre-slurry was introduced in a first mill. The product from the first mill was then introduced in a second mill. After the second mill, no other actions were performed to the slurry.

Samples were taken from the first (samples 1 and 2) and the second mill (sample 3).

A second trial was performed with pre-slurry at 60% of solid content. Samples were taken from the first (sample 5) and the second mill (sample 6).

A third test was done with similar conditions to the first one. The difference was that the slurry after the mill was sieved using 100 μm nets. The rejected was going back to the mill, with some losses due to the high flow rate and viscosity of the rejected product.

The sieving presented severe problems, with the rejected product from the sieves being about 70% of the feeding. The dispersant does not permit an efficient sieving of the slurry. A sample of the sieved slurry was taken (sample 6).

Talc slurry samples were stabilized.

Table 3 shows the final composition of the samples, after stabilisation.

The making of each sample is described in Appendix 1, with the actions described by chronological order.

Conclusions:
  Talc slurries with $d_{50}$ between 1.45 and 7.36 μm and solids content between 40.3 and 60.1% were made.
  The making of the pre-slurry presented no major problems, although corrections of the pH had to be performed.
  The operation of the mills was stable after solving some initial problems. Even at 60% solids, the mills presented no problems.
  Samples were taken from the mills at 50 and 60% solids content.
  The samples of the slurries were stabilized with two cellulose thickeners. The Celflow product shown a good effect on increasing viscosity at low shear rates and decreasing it at high shear rates.

Figure 1:
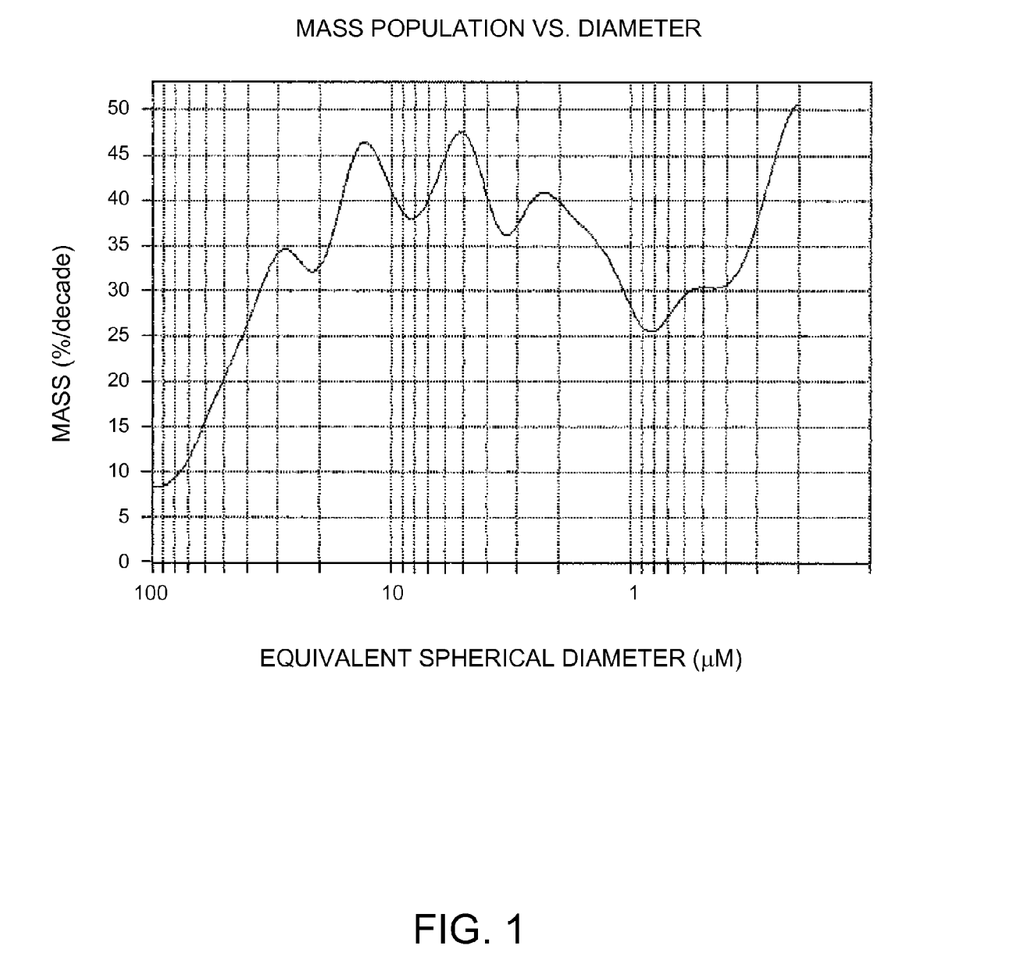
FIG. 1 is a graph displaying the mass population vs. particle size of the talc produced in Sample 1.

1.5 μm
3.8 μm
9.3 μm
19.5 μm
37 μm
Solids content: 51.7%
Granulometry:
$d_{50}$=3.09 μm
Viscosity at 25° C.:
$\eta^{10\ rpm}$=200 cP $\eta^{100\ rpm}$=386 cP
Celflow—125 g (0.1% of talc)
$\eta^{10\ rpm}$=900 cP $\eta^{100\ rpm}$=265 cP
pH=8.6
NaOH (10%)—100 mL
$\eta^{10\ rpm}$=200 cP $\eta^{100\ rpm}$=160 cP
pH=9.5
Thor MBF28—0.2 kg
Celflow—0.0625 kg
$\eta^{10\ rpm}$=930 cP $\eta^{100\ rpm}$=260 cP.

Sample 2

Description: sample from the first mill, with pre-slurry at 50% solid content.

120 kg of slurry. Characteristics equal to sample 1.

Figure 2:
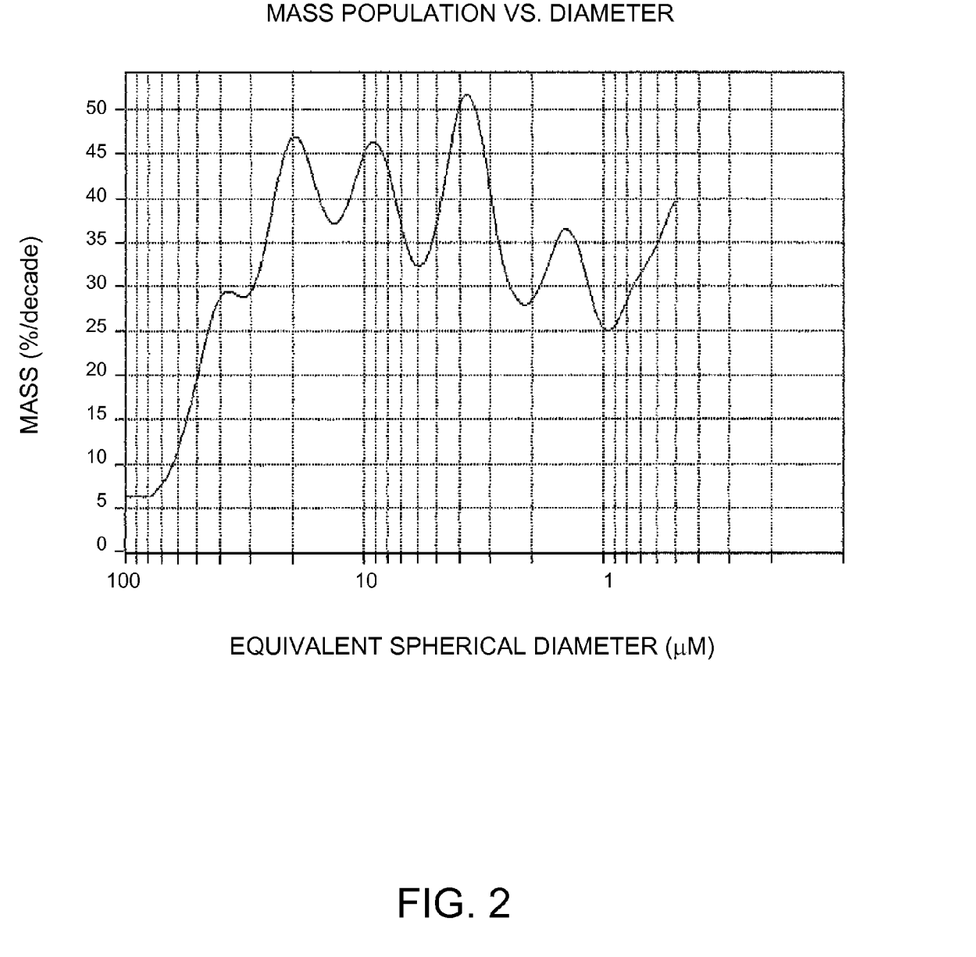
FIG. 2 is a graph displaying the mass population vs. particle size of the talc produced in Sample 2.

Mass population vs. particle size of talc in sample 2 is expressed in FIG. 2. Said talc product has following peaks of particle size distribution:
  2.4 μm
  5.2 μm
  13 μm
  28 μm
Finnfix 2000G—0.125 kg
$\eta^{10\ rpm}$=215 cP $\eta^{100\ rpm}$=173 cP
Finnfix 2000G—0.0625 kg
$\eta^{10\ rpm}$=450 cP $\eta^{100\ rpm}$=190 cP
Finnfix 2000G—0.0625 kg
$\eta^{10\ rpm}$=1020 cP $\eta^{100\ rpm}$=272 cP
Thor MBF 28—0.2 kg
pH=9.0
NaOH (10%)—50 mL
pH=9.5
$\eta^{10\ rpm}$=430 cP $\eta^{100\ rpm}$=176 cP
Finnfix 2000G—0.0625 kg
$\eta^{10\ rpm}$=1320 cP $\eta^{100\ rpm}$=310 cP.

TABLE 3

Talc slurry samples

| Sample | Slurry (kg) | Solids content (%) | $d_{50}$ (μm) | Biocide (%) | NaOH (10%) (%) | Celflow (%) | Finnfix 2000G (%) | $\eta^{10\ rpm}$ (cP) | $\eta^{100\ rpm}$ (cP) | Particles above 63 μm (%) |
|---|---|---|---|---|---|---|---|---|---|---|
| 1 | 120 | 51.7 | 3.1 | 0.2 | 0.08 | 0.3 | — | 930 | 260 | 13.1 |
| 2 | 120 | 51.7 | 3.2 | 0.2 | 0.04 | — | 0.5 | 1320 | 310 | 13.1 |
| 3 | 200 | 55.0 | 1.6 | 0.2 | 0.03 | — | — | 1440 | 1248 | 3.8 |
| 4 | 260 | 58.6 | 8.4 | 0.2 | 0.04 | 0.15 | — | 680 | 412 | 21.9 |
| 5 | 200 | 60.1 | 3.3 | 0.2 | 0.05 | — | — | 930 | 995 | 10.2 |
| 6 | 545 | 40.3 | 2.4 | 0.2 | — | 0.2 | — | 360 | 110 | 2.4 |

Sample 1

Description: sample from the first mill, with pre-slurry at 50% solid content.

120 kg of slurry.

Mass population vs. particle size of talc in sample 1 is expressed in FIG. 1. Said talc product has following peaks of particle size distribution:

Sample 3

Description: sample from the second mill, with pre-slurry at 50% solid content.

200 kg of slurry.

Figure 3:
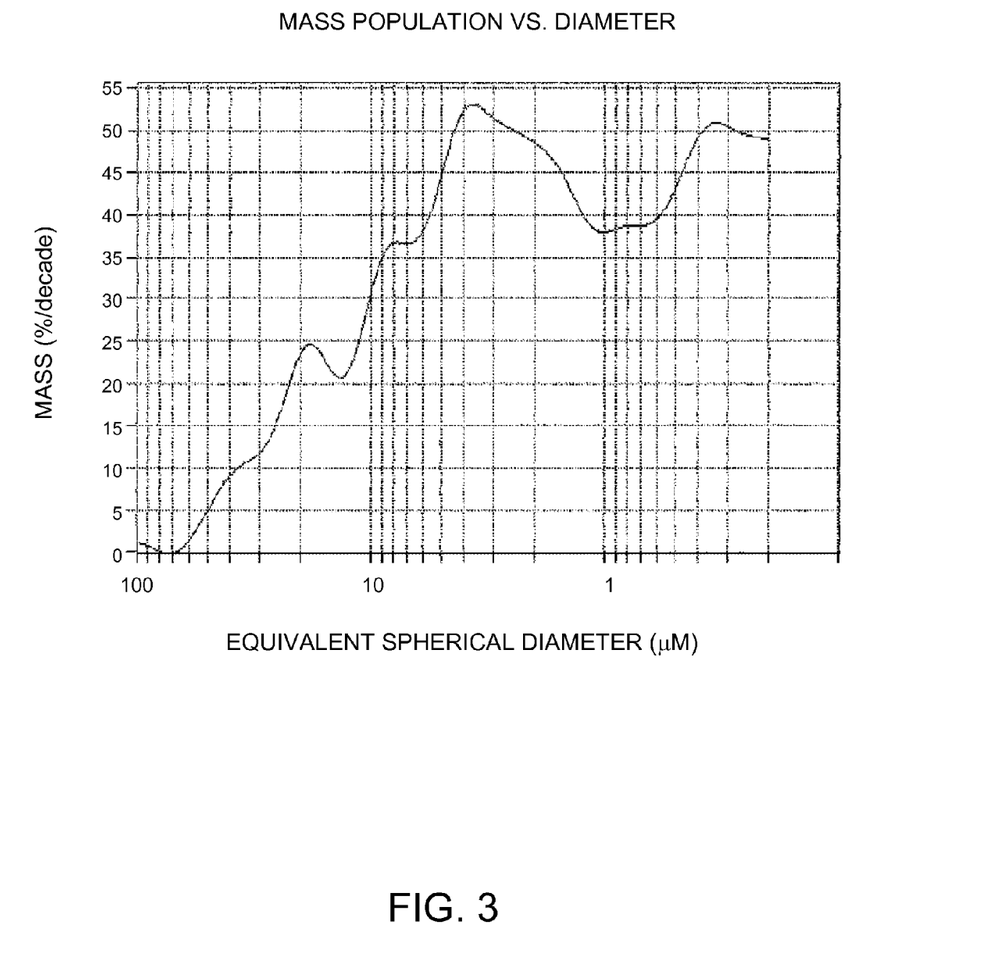
FIG. 3 is a graph displaying the mass population vs. particle size of the talc produced in Sample 3.

Mass population vs. particle size of talc in sample 3 is expressed in FIG. 3. Said talc product has following peaks of particle size distribution:

3.8 μm
8.0 μm
18 μm
Solids content: 55.0%
Granulometry:
$d_{50}$=1.45 μm
Thor MBF 28—0.4 kg
pH=9.3
NaOH (10%)—50 mL
pH=9.5
Viscosity at 25° C. (spl 4):
$\eta^{10\ rpm}$=1440 cP $\eta^{100\ rpm}$=1248 cP
No cellulose was added to this slurry.

Sample 4

Figure 4:
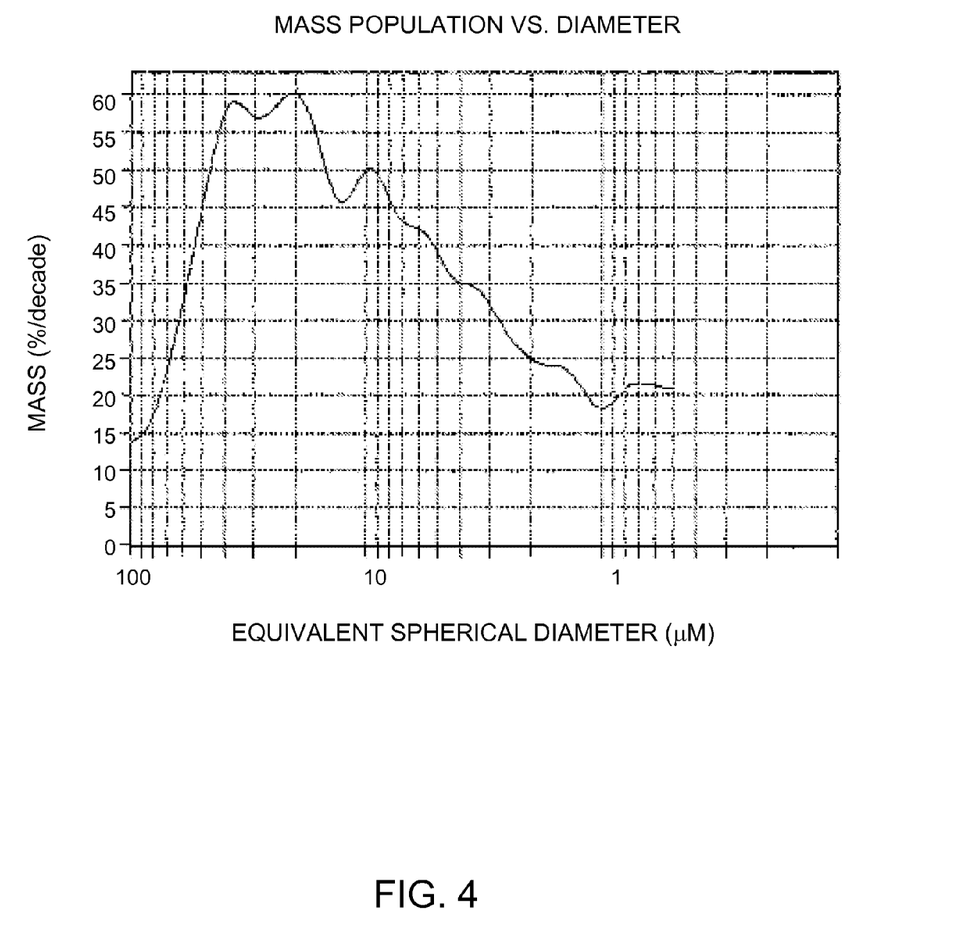
FIG. 4 is a graph displaying the mass population vs. particle size of the talc produced in Sample 4.

Description: sample from the first mill, with pre-slurry at 60% solid content.
260 kg of slurry.
Mass population vs. particle size of talc in sample 4 is expressed in FIG. 4. Said talc product has following peaks of particle size distribution:
1.5 μm
9.6 μm
20 μm
38 μm
Solids content: 58.6%
Granulometry:
$d_{50}$=7.36 μm
Thor MBF 28—0.5 kg
pH=9.1
NaOH (10%)—100 mL
pH=9.5
NaOH (10%)—15 mL
pH=9.5
Viscosity at 25° C.:
$\eta^{10\ rpm}$=400 cP $\eta^{100\ rpm}$=510 cP
Celfow—0.1300 kg
$\eta^{10\ rpm}$=620 cP $\eta^{100\ rpm}$=386 cP
Celflow—0.0650 kg
$\eta^{10\ rpm}$=680 cP $\eta^{100\ rpm}$=412 cP.

Sample 5

Figure 5:
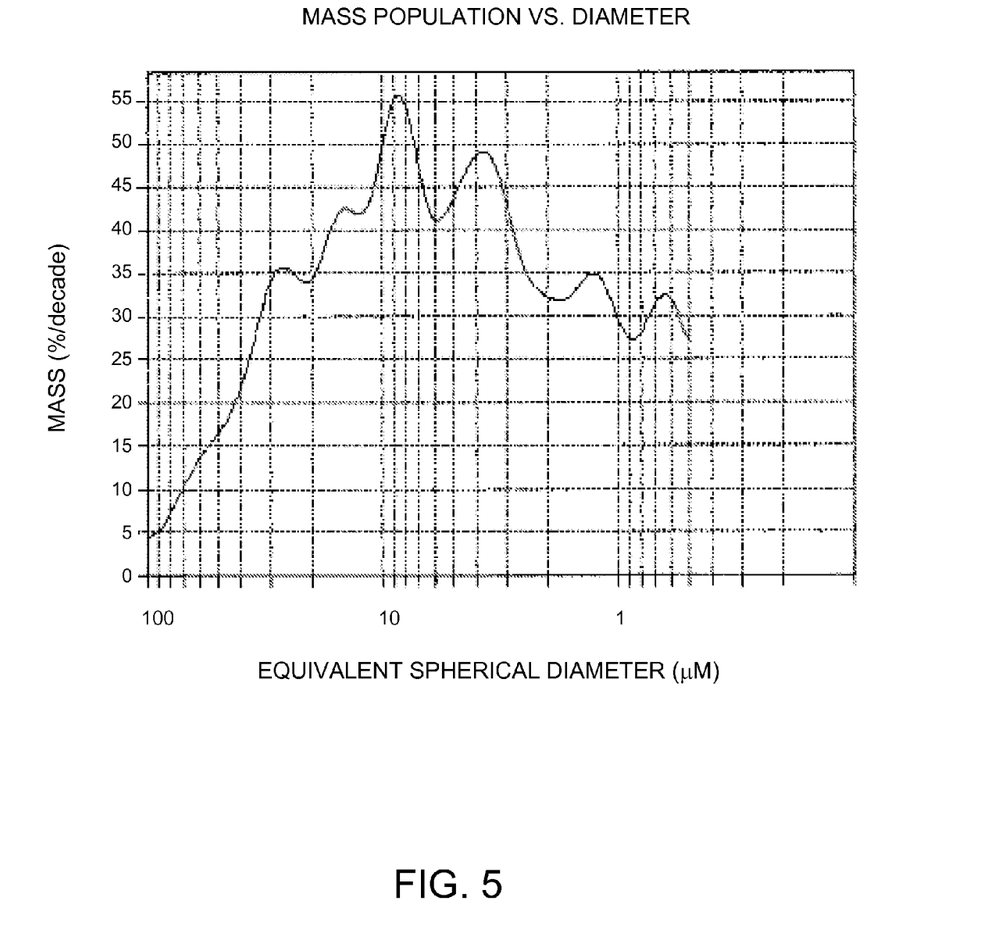
FIG. 5 is a graph displaying the mass population vs. particle size of the talc produced in Sample 5.

Description: sample from the second mill, with pre-slurry at 60% solid content.
200 kg of slurry.
Mass population vs. particle size of talc in sample 5 is expressed in FIG. 5. Said talc product has following peaks of particle size distribution:
1.3 μm
3.8 μm
8.5 μm
16 μm
27 μm
Solids content: 60.1%
Granulometry:
$d_{50}$=3.30 μm
Viscosity at 25° C. (spl 6):
$\eta^{10\ rpm}$=1200 cP $\eta^{100\ rpm}$=1840 cP
Thor MBF 28—0.4 kg
pH=8.9
NaOH (10%)—100 mL
pH=9.4
Viscosity at 25° C. (spl 3):
$\eta^{10\ rpm}$=930 cP $\eta^{100\ rpm}$=995 cP
No cellulose was added to this sample.

Sample 6

Figure 6:
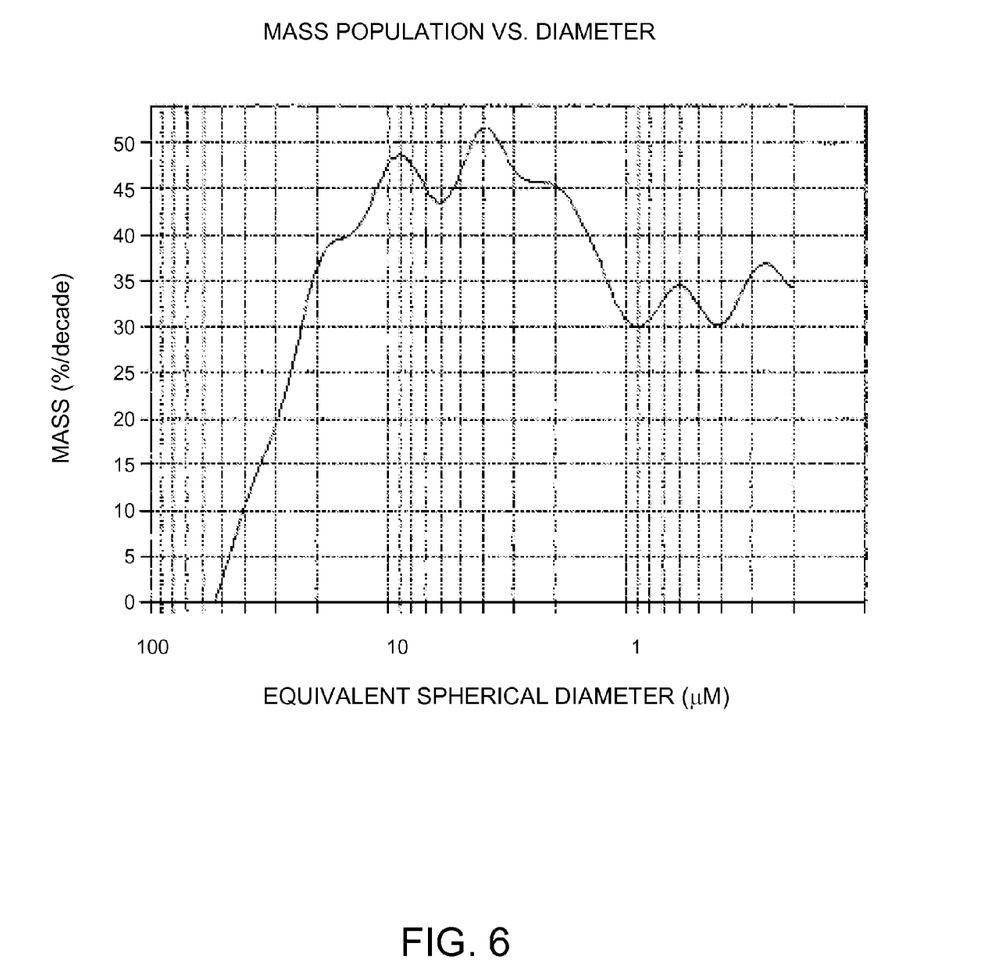
FIG. 6 is a graph displaying the mass population vs. particle size of the talc produced in Sample 6.

Description: Sieved sample from the mill, with pre-slurry at 50% solid content.
545 kg of slurry.
Mass population vs. particle size of talc in sample 6 is expressed in FIG. 6. Said talc product has following peaks of particle size distribution:
4.0 μm
9.0 μm
Solids content: 40.3%
Granulometry:
$d_{50}$=2.83 μm
Thor MBF 28—1.1 kg
pH=9.4
Celflow—218 g
$\eta^{10\ rpm}$=130 cP $\eta^{100\ rpm}$=81 cP
Celflow—218 g
$\eta^{10\ rpm}$=360 cP $\eta^{100\ rpm}$=110 cP.

The invention claimed is:

1. A method for producing a talc slurry for paint products, comprising:
   granulating dry talc powder,
   dispersing said granulated talc in water with dispersant chemicals to form a talc slurry,
   adding base to achieve a pH-value of 9.0 or higher in the talc slurry, and
   adding thickener to the talc slurry,
   wherein said talc slurry has:
   a total solids (TS) content of 40% or higher, and
   a unimodal particle size distribution between 1 to 50 μm.

2. The method according to claim 1, further comprising sieving the talc slurry.

3. The method according to claim 1, wherein said talc slurry has at least one peak of particle size distribution between 1 to 5 μm.

4. The method according to claim 1, wherein said talc slurry has at least one peak of particle size distribution between 5 to 20 μm.

5. The method according to claim 1, wherein said talc slurry has at least one peak of particle size distribution between 10 to 50 μm.

6. The method according to claim 1, wherein the total solids (TS) content of said talc slurry is 50% or higher.

7. The method according to claim 1, wherein said talc slurry has a storage stability of 10% or below.

8. The method according to claim 1, wherein the total solids (TS) content of said talc slurry is 60% or higher.

9. The method according to claim 1, wherein said talc slurry has a viscosity of 300 to 600 mPas.

10. A method for producing a talc slurry for paint products, comprising:
    granulating dry talc powder,
    dispersing said granulated talc in water with dispersant chemicals to form a talc slurry,
    adding base to achieve a pH-value of 9.0 or higher in the talc slurry, and
    adding thickener to the talc slurry,
    wherein said talc slurry has:
    a total solids (TS) content of 40% or higher, and
    a multimodal particle size distribution between 1 to 50 μm.

11. The method according to claim 10, further comprising sieving the talc slurry.

12. The method according to claim 10, wherein said talc slurry has at least one peak of particle size distribution between 1 to 5 μm.

13. The method according to claim 10, wherein said talc slurry has at least two peaks of particle size distribution between 1 to 50 μm.

14. The method according to claim 10, wherein said talc slurry has at least one peak of particle size distribution between 5 to 20 μm.

15. The method according to claim 10, wherein said talc slurry has at least one peak of particle size distribution between 10 to 50 µm.

16. The method according to claim 10, wherein the total solids (TS) content of said talc slurry is 50% or higher.

17. The method according to claim 10, wherein said talc slurry has a storage stability of 10% or below.

18. The method according to claim 10, wherein the total solids (TS) content of said talc slurry is 60% or higher.

19. The method according to claim 10, wherein said talc slurry has a viscosity of 300 to 600 mPas.

* * * * *